United States Patent [19]
Rowsell

[11] Patent Number: 5,342,525
[45] Date of Patent: * Aug. 30, 1994

[54] METHOD FOR AIDING MICROBIAL DEGRADATION OF SPILLED OIL

[76] Inventor: Farrell D. Rowsell, 2665 Belcastro St., Las Vegas, Nev. 89117

[*] Notice: The portion of the term of this patent subsequent to Jan. 5, 2010 has been disclaimed.

[21] Appl. No.: 897,373

[22] Filed: Jun. 11, 1992

Related U.S. Application Data

[63] Continuation-in-part of Ser. No. 784,458, Oct. 28, 1991, Pat. No. 5,176,831.

[51] Int. Cl.$^5$ .............................. C02F 1/28; C02F 3/34
[52] U.S. Cl. .................................... 210/611; 210/631; 210/691; 210/922; 435/281
[58] Field of Search ............... 210/691, 693, 692, 705, 210/728, 730, 922, 924, 925, 908, 631, 776, 611, 610; 435/281

[56] References Cited

U.S. PATENT DOCUMENTS

| | | | |
|---|---|---|---|
| 2,531,427 | 11/1950 | Hauser | 260/448 |
| 2,966,506 | 12/1960 | Jordan | 260/448 |
| 3,152,983 | 10/1964 | Davis et al. | 210/922 |
| 3,634,227 | 1/1972 | Patterson | 210/11 |
| 3,769,164 | 10/1973 | Azarowkz | 195/2 |
| 3,843,517 | 10/1974 | McKinney et al. | 210/922 |
| 3,856,667 | 12/1974 | Azaronicz | 210/922 |
| 3,871,957 | 3/1975 | Mohan | 195/2 |
| 3,948,770 | 4/1976 | Goodrich | 210/40 |
| 4,087,356 | 5/1978 | Marconi et al. | 210/922 |
| 4,284,509 | 8/1981 | Lindörfer et al. | 210/922 |
| 4,462,910 | 7/1984 | Lepain et al. | 210/922 |
| 4,473,477 | 9/1984 | Beall | 210/691 |
| 4,650,590 | 3/1987 | Beall | 210/691 |
| 4,778,627 | 10/1988 | Doan | 252/631 |
| 5,176,831 | 1/1993 | Rowsell | 210/631 |

FOREIGN PATENT DOCUMENTS

| 2511485 | 10/1975 | Fed. Rep. of Germany | 210/922 |
|---|---|---|---|
| 2128979 | 5/1984 | United Kingdom | 210/922 |

Primary Examiner—Neil M. McCarthy
Attorney, Agent, or Firm—Dorr, Carson, Sloan & Peterson

[57] ABSTRACT

Oil spills on natural bodies of water can be cleaned up through the use of flocculation/microorganism compositions including amine-substituted clay flocculation agents and microorganisms including bacillus species, pseudomonas species, azobacter species and xanthomonas species.

68 Claims, 1 Drawing Sheet

METHOD FOR AIDING MICROBIAL DEGRADATION OF SPILLED OIL

BACKGROUND OF THE INVENTION

Related Applications

This patent application is a continuation-in-part patent application of U.S. Patent application Ser. No. 784,458, filed Oct. 28, 1991, now U.S. Pat. No. 5,176,831 and entitled "Method For Herding And/Or Recovering Spilled Oil."

1. Field of the Invention

This invention generally relates to methods of cleaning up oil spills from natural bodies of water such as oceans, seas, lakes, harbors and rivers. More specifically, this invention relates to methods for flocculating and/or agglomerating spilled oil associated with a natural body of water, such as a floating layer or film of oil and/or dispersed oil droplets, emulsions, etc., in order to facilitate its subsequent degradation through the use of microorganisms which are capable of using the spilled oil as a nutrient source.

2. Prior Art

Oil pollution of natural bodies of water, and especially of the ocean, has caused extensive environmental problems and ever mounting public concern. Such pollution has been caused by illegal dumping, accidents, warfare and leakage from oil drilling operations in continental shelf regions. Regardless of their cause, however, oil spills invariably produce extensive ecological and/or economic damage by destroying or tainting many forms of aquatic life and by fouling water intakes, recreational beaches, boats, fishing gear, harbor installations and the like.

Unfortunately, oil cleanup operations are both physically and technically difficult; they normally involve one or more of the following measures: (1) physical removal of the oil from the water, with or without the use of adsorbents, (2) dispersion of the oil through the use of detergents, (3) "sinking" the spilled oil, (4) burning floating oil slicks and (5) using microorganisms which digest the spilled oil and thereby eliminate it. Each of these measures has its own set of special environmental and technical considerations.

Physical removal (e.g., by "skimming" or pumping operations) is of course the most ecologically desirable remedy but, using existing technologies, it is feasible only under nearly ideal weather, water turbulence and response time conditions. Generally speaking, seas higher than about 1-2 feet, currents in excess of 2-3 knots and/or the passage of a few day's time usually makes physical removal operations largely ineffective and extremely costly.

Dispersion of spilled oil through the use of detergents can be accomplished much more quickly, but this technology has several detrimental side effects. For example, the detergents normally employed to disperse spilled oil are very often toxic to aquatic life in their own right. Moreover, their use also tends to bring the spilled oil into more intimate contact with living organisms than it might otherwise attain.

Sinking has its own set of detrimental side effects, e.g., sinking strongly retards the ultimate degradation of the oil by incorporating it into underwater sediments where anaerobic conditions may prevail. However, not all water body bottoms are anaerobic or biologically inert. For example, nearshore areas often have high levels of biological activity as evidenced by the presence of kelps, shellfish, worms, etc. in such areas. Consequently, these forms of life may be completely wiped out by "sinking" an oil spill into their delicate habitats.

Burning is of course greatly restricted by: the difficulties associated with getting "oil-on-water" fires started, ecological concerns regarding any incomplete burning of the oil and any attendant air pollution problems produced by such burning. Obviously, such burning also will be restricted by any local fire hazard considerations. Burning also represents a total economic waste of the oil.

The prior art also has long recognized that spilled oil may be "cleaned up" through the use of a wide variety of microorganisms, e.g., bacteria, actinomycetes, yeasts and fungi. That is to say that many microorganisms are known to have the ability to degrade (oxidize), digest, etc., oil and thus aid in cleaning up an oil spill. Moreover, many microorganisms have been mutated for their enhanced ability to utilize the carbon compounds of oil for the energy source and carbon requirements for their growth. In effect, such microorganisms break down oil and convert masses of spilled oil into masses of edible, non-toxic living cells. Such a cell mass is then channeled into the food chain to feed higher forms of marine life and, thus, a very advantageous end result is achieved in addition to solving the problem of oil or petroleum spillage. Furthermore, there may be no need for ancillary clean-up operations when an oil spill is degraded in this manner.

The chief drawback to the use of microorganisms in cleaning up oil spills is that such procedures take too long. That is to say that the spilled oil may spread over large areas and do great harm to the environment before such microorganisms have a chance to completely degrade the oil by their digestive actions. Moreover, such procedures are hampered by the fact that the oil spill environments into which such microorganisms are introduced change rapidly as an oil slick thins out into an oil film and/or is churned into an oil/water emulsion. Many microorganisms cannot thrive in all such environments. Thus, a changing environment makes it difficult to get some microorganism colonies started; or once they are started they may be extinguished by the rapidly changing form of the spilled oil.

Many physical removal and/or microbial degradation methods are accompanied by the use of adsorbents such as finely divided or porous solid materials (e.g., straw, clays, sawdust, etc.) in order to help agglomerate oil films and/or oil/water emulsions. Some adsorbents also serve as nutrients for the microorganisms. With respect to agglomeration for its own sake, it is desirable because it ultimately aids in the physical gathering of the spilled oil. In effect, agglomeration of this kind produces relatively large, thick, distinct, patches or globs of more viscous, but still "liquid", oil from those relatively thin slicks or films of oil which reside on the water's surface and/or from those finely dispersed, droplets which comprise oil/water emulsions. This agglomeration action is brought about by surface and capillary actions of these materials upon spilled oil. Various clays have been used or at least suggested for use as such oil agglomeration agents, e.g., attapulgite, bentonite, kaolin and montmorillonite are most frequently suggested.

It also should be noted that various clays have been employed as carriers for such microorganisms. Some of the more preferred carrier materials have included clays such as kaolin, zeolites and other microporous silica-alumina materials, silica gels, vermiculities and perlites, and particularly these in hydrophillic forms. These materials also have included microporous materials of the class into which microorganisms and nutrients or microorganisms alone can be absorbed and which will subsequently absorb oil so as to bring this oil into a close relationship with the microorganisms for digestion. Such materials are however subject to all of the physical actions of the sea upon the spilled oil. That is to say that, regardless of whether a clay is being used as an oil adsorbent agent or as an agent to "house" a microorganism colony, it is still subject to being diluted, sunk and/or washed away through various physical actions of the body of water in which the oil spill occurs.

Consequently, cleanup operations using such clays have not been widely employed, either with or without the conjunctive presence of oil—digesting microorganisms, largely because, in spite of their ability to sorb oil, such clays also tend to allow the oil to desorb in relatively short periods of time. That is to say that these clays, in the context of an oil spill on water, tend to allow the oil to desorb before the oil patches produced by them can be physically collected or otherwise treated, e.g., by chemical treatment, microorganism digestion, etc. Moreover, use of such clays, in absence of other floatable materials such as sawdust, wood chips, etc., also tends to produce agglomerated materials which may well sink oil agglomerates.

It also should be noted that with respect to the physical handling problems associated with such cleanup operations, especially in the case where microorganisms are not employed, even if a floating oil film and/or a finely dispersed oil/water emulsion can be successfully converted into relatively large droplets of oil by the use of such clays, and even if those large droplets, once formed, form distinct patches which can exist on the surface of the water for periods of time long enough to be successfully collected, the inherent problems generally associated with separating one liquid from another liquid still remain as a distinctly troublesome part of the overall cleanup problem. For example, the "liquid from liquid" (i.e., oil from water) separation problem which must be overcome in order to clean up an oil spill generally entails picking up large volumes of water along with an agglomerated oil/clay material which has an essentially "liquid" character. In fact, a very large proportion of the total material picked up in such cleanup operations is in fact water. That is to say that oil cleanup operations which use the previously noted clays in order to agglomerate oil films and/or oil/water emulsions into larger oil droplets and/or into larger oil patches do not avoid the problem of mechanically taking up (e.g., by suction and/or pumping operations) those large volumes of water with which relatively the smaller volumes of liquid oil are associated. Consequently, various additional "oil from water" separation processes are needed to complete the overall cleanup operation. They are normally performed in tanks on board ships, barges, tenders, etc. under those relatively controlled, quiescent, conditions needed to effect the physical and/or chemical separation of these two liquids as well as any clays, straws, sawdust, etc. with which these fluids are associated. Thus, large volumes of oil-contaminated water must be physically handled and chemically treated, in closed vessels, in order to successfully capture those relatively small volumes of oil associated with the oil-contaminated water. The expense of handling and treating such large volumes of water is enormous. Worse yet, the time needed to take up and treat such large volumes of water and its associated oil is painfully long when viewed from the standpoint that the spilled oil is relentlessly damaging the environment while simultaneously becoming more and more difficult to recover as it becomes more and more dispersed with the passage of time.

Some representative methods for using clays to convert oil films and/or oil/water emulsions into larger oil droplets and patches in order to facilitate subsequent oil/water separation operations and/or to facilitate microbial degradation of the spilled oil are taught in the following patent references which are each incorporated by reference into this patent disclosure.

U.S. Pat. No. 3,634,227 generally teaches use of various clays such as attapulgite, bentonite, and kaolin to agglomerate spilled oil in order to facilitate its collection from the surface of the water.

U.S. Pat. No. 2,531,427 teaches that clays of the same type employed by applicant can be substituted with amine groups to produce "organoclays" which are generally capable of forming stable gels and colloidal dispersions in various industrial processes. In general, the amine-treated clays taught by this reference constitute the same kinds of "organoclays" employed by applicant in these processes.

U.S. Pat. No. 4,778,627 teaches a process for disposing of radioactive liquid hydrocarbons by adding an organic ammonium montorillonite clay to such liquids in quantities sufficient to produce a solid waste product.

U.S. Pat. No. 3,948,770 teaches that mixtures of finely dispersed oil droplets and sea water, and especially those present in oil tanker compartments, can be separated through the use of a flocculating agent comprised of a dry powered mixture of an anionic polyelectrolyte, such as an anionic copolymer of acrylamide, and a montmorillonite clay. This reference also notes that when small quantities of oil are finely dispersed within a relatively large body of water - a situation typically found in the slop tanks of large oil tankers - separation of those fine droplets of oil is normally extremely slow and that a much more rapid agglomeration into a distinct oil phase may be obtained by use of the therein disclosed anionic polyelectrolyte/clay mixture.

U.S. Pat. No. 4,473,477 ("the 477 patent") teaches that certain organoclays of the same type employed in applicant's patent disclosure can be used to solidify fluid waste materials in retention ponds or lagoons designed to hold such fluid waste materials. Typically, the fluid wastes are contained by an impermeable liner which forms the bottom and sides of the waste pond. This reference also teaches that an adjunct bed of such organoclays can be employed in order to capture certain organic contaminants before they enter local ground waters. Thus, a contaminated fluid flowing through these beds will have its associated organic materials removed by the bed so that the resulting leachate (e.g., water) can be safely released into the environment.

In another embodiment of the invention described in the 477 patent (which embodiment is discussed from column 7, line 56 to column 8, line 3 of this reference), an organoclay is sprayed on an artificial lagoon containing an oil-contaminated fluid such as water. In this particular embodiment, the organoclays are added in quantities such that the organoclay sorbs the oil and forms agglomerate clumps which sink to the bottom and/or sides of the lagoon in order to produce an impermeable layer or liner "plug" which serves to stop the flow of oil-contaminated water into local ground waters.

Some representative patents which focus on the use of various microorganisms for the degradation of spilled oil are taught in the following patent references:

U.S. Pat. No. 3,871,957 teaches methods of applying certain microorganisms for rapid dispersal of oil spills. The microorganisms so employed include a wide variety of bacteria yeasts, actinomyces and filamentous fungi. This reference also teaches use of certain clays such as kaolin or zeolites as carriers for such microorganisms.

U. S. Pat. No. 3,769,164 teaches a process for the microbial degradation of spilled petroleum by treating it with specially mutated species of microorganisms *Canadida parapsilosis* (ATCC 20246), *Aspergillus sp.* (ATCC 20253), *Nocardia corallina* (ATCC 21504), etc.

The teachings of these references are also incorporated by reference into this patent application.

SUMMARY OF THE INVENTION

This invention is an overall procedure to aid in a microbial degradation of oil spilled in a large body of water. The procedure can employ a wide variety of hydrocarbon-utilizing microorganisms. The most important advantage of the present invention is that the oil is quickly transformed into a long lasting, agglomerated form which promotes the microbial degradation process while simultaneously hindering further dispersion of the oil over larger areas and/or into harbors, beaches, boats, etc. This combined feature is of great practical value in cleaning up oil spills in a natural body of water such as a sea, a lake, a river, etc.

That is to say that applicant has discovered a process for flocculating and/or agglomerating and then degrading spilled oil (for the purposes of this patent disclosure, the terms "flocculation" and "agglomeration" may be taken to mean substantially the same thing) associated with a body of water, e.g., spilled oil associated with such water as a floating oil film and/or as dispersed oil droplets, emulsions, etc. For the purposes of this patent disclosure, the term "oil" as used herein refers to a wide variety of organic carbon-containing compounds, including crude petroleum, straight and branched-chain alkanes (including paraffins of varying molecular weights) and other aliphatic compounds (including alicyclics such as cyclohexane) as well as aromatic heterocyclic and carbocyclic compounds. In any case, applicant's flocculation/degradation techniques can be used to facilitate recovery, containment and/or further treatment of spilled oil. Such further treatment will specifically include the degradation of agglomerated oil through the use of certain hereinafter described microorganisms.

For example, in some special oil spill situations, e.g., spills in relatively shallow bodies of water, applicant's process may serve to cause a more or less continuous surface film of oil (which shuts off light and oxygen passage through the water) to be quickly (e.g., within a period of time of from 20–60 minutes) broken up and "herded" into relatively small "islands" of agglomerated oil and thereby leaving large openings of clear water which will pass sunlight and, hence, which will aid in the survival of many flora and fauna which otherwise would perish under a film of oil on their water habitat. In such usages applicant's "flocculation agent" may also be called a "herding agent." In most cases, however, the spilled oil will not only be "herded", it also will be further flocculated into floating, solid clumps which form a more contained and controlled environment (as opposed to an ever dispersing oil slick) in which a microorganism colony can grow by digesting the oil associated with such clumps. That is to say that when certain oil digesting microorganisms are incorporated into the islands of agglomerated oil and/or into those floating solid clumps created by applicant's agglomeration agents, the microorganism's ability to digest the oil is greatly enhanced, i.e., the microorganism's ability to degrade oil in these agglomerated forms is greater than the microorganism's ability to digest the same oil if it were presented to the microorganism as an untreated film or slick of the oil.

Generally speaking, the process of this patent disclosure comprises loading or casting on to the spilled oil a mixture comprised of an aminesubstituted clay and a microorganism selected from the group of microorganisms consisting of Bacillus sp., Pseudomonas sp., Azobacter sp., and Xanthomonas sp. The most important and distinct characteristic of any of the above noted microorganism genera is that they have a hydrocarbon-utilizing character and, hence, have the ability to attack and degrade spilled petroleum, oil, etc. in accordance with the general teachings and objectives of this invention. That is to say that these particular clays are used to flocculate and/or agglomerate an oil originally contained in a continuous "film" on the surface of the water and/or contained in an oil/water emulsions into: (a) small (relative to the size of an oil film) distinct floating oil patches or "islands" separated by spaces of unpolluted water and/or (b) distinct buoyant, quasi-solid, clumps. The microorganisms can be incorporated into both the "islands" and the "clumps" formed by the use of applicant's aminesubstituted clays. These islands and/or clumps are each particularly characterized by their oil component's enhanced ability to undergo digestion, oxidation, degradation, etc. by the action of the microorganism employed to carry out these processes.

The amine-substituted clays used in these processes are generally produced by reacting a water swelling clay, e.g., a smectite clay, with an amine compound selected from the group consisting of a primary amine salt, a secondary amine salt, a tertiary amine salt or a quaternary ammonium salt. Each of these salts is, most preferably, further characterized by its possession of an organosubstituent in order to produce a material which might be characterized as an "organoclay" flocculation agent. Thus, less preferred, but still very useful, amine substituted clays for the practice of this invention may have no organo group substituent; but applicant's more preferred flocculation agents also will have certain hereinafter described organo groups as part of their overall chemical structures.

In either case however, because the amine substitution of the clay molecule is such an extremely important aspect of this invention, those clays which are capable of undergoing reactions with amine compounds, e.g., those having substantial ion exchange capacities, generally will constitute the more preferred starting materials for the clays used in making the flocculation agents employed by this particular process. The more preferred aminesubstituted clays and/or organo organoaminesubstituted clays for the practice of this invention, as well as certain preferred methods for producing them, are generally described in U.S. Pat. Nos. 4,473,477; 4,778,627 and 2,531,427 and these three references are specifically incorporated by reference, in their entireties, into this patent disclosure.

Again, the preferred clay starting materials for producing the amine-substituted (and/or organoaminesubstituted) clays which are employed in our processes are smectite-type clays, particularly those having a cation exchange capacity of at least 75 milliequivalents per 100 grams of clay. Such ion exchange capacities may exist in certain natural clays. However, those natural clays having lower ion exchange capacities may be chemically treated in order to give them higher ion exchange capacities. For example, such clays can be converted to more suitable metallic ion containing forms, e.g., sodium forms, if they are not already in such forms in their natural state. This can be effected by well known cation exchange reactions with, say, soluble sodium compounds. For example, such exchanges may be readily accomplished by mixing such clays with an aqueous solution of a sodium salt such as sodium carbonate or sodium chloride and then recovering a high sodium content clay product. In either case, the object is to obtain and/or prepare clays suitable for reaction with the amine (and/or organoamine) compounds which create the compounds which are used in the herein disclosed oil spill cleanup process.

Montmorillonite, bentonite, beidelite, hectorite, saponite, sepiolite and stevensite clays are especially well suited for producing our particular flocculation or agglomeration agents. Mixtures of such clays can be used as well. Among the clays noted above, montmorillonite clays selected from the group consisting of sodium montmorillonite, calcium montmorillonite or magnesium montmorillonite are especially well suited for creation of the aminesubstituted (and/or organoamine-substituted) clays which are subsequently used to carry out the herein disclosed oil spill cleanup processes. One preferred montmorillonite type clay for use in such clay/amine compound reactions is a sodium montmorillonite clay having at least a 50% milliequivalent exchangeable cation concentration (meq/%). Even more preferred are those sodium montmorillonite clays having between about 60 and about 75% sodium meq/%. Perhaps the most preferred montmorillonite clays for the production of the flocculation agents of our process are those which constitute the principal constituents of bentonire rock. Generally they have the chemical compositions and characteristics described in Berry and Mason, "Mineralogy", 1959, pp. 508-509. Still other organoclays which may be used for the practice of this invention might comprise the higher dialkyl dimethyl ammonium organoclays such as dimethyl di(hydrogenated tallow) ammonium chloride, sodium montmorillonite, dimethyl di(hydrogenated tallow) ammonium bentonite; the benzyl ammonium organoclays, such as dimethyl benzyl (hydrogenated tallow) ammonium bentonite; and ethylhydroxy ammonium organoclays such as methylhis (2-hydroxyethyl) octodecyl ammonium bentonite.

The natural or ion-exchanged enhanced clay starting materials can be reacted with the hereinafter described amine compounds in various ways. By way of example, such reactions may be accomplished by merely mixing or mulling a dry clay material with the selected amine. Alternatively, wet processes may be used wherein the clay is slurried in fresh water and an amine and/or ammonium salt added to the slurry. In general, the amounts of such ammonium salts substituted on the clays can vary between about 0.5% to about 50% of the resulting organoclay's weight. The clay/amine reaction products are then filtered or centrifuged from the slurry and dried to a low moisture content. However, a small percentage of water may sometimes be retained to attain maximum product efficiency. For example, the retention of a few percent of water, e.g., between about 1 and about 5% water based on a final organo ammonium clay product may prove beneficial.

For the purposes of this patent disclosure, the term "organoclays" has been, and will be, used to describe the more preferred flocculation or agglomeration agents used in our processes, i.e., water swelling clays having certain "organoamine" or "organoammonium" ion substituents thereon. Most preferably, the "organo" portion of our organoclays will be provided in the form of an organosubstituent which forms a part of an amine group (i.e., a part of a primary, secondary and/or tertiary amine salt) which is, in turn, substituted on to the clay molecule. Generally speaking, such organo groups most preferably will be an organo group selected from the group consisting of aliphatic, aromatic, cyclic, heterocyclic, or polyamine groups. Such organo groups most preferably will range in size from 1 to 24 carbon atoms. The most preferred of these are those organo substitutents having at least 10 carbon atoms such as those having dodecyl, hexadecyl, octadecyl, dimethyloctadecyl groups. In general, however, the most preferred organoammonium ion substituents for our purposes are those described in U.S. Pat. Nos. 2,531,427 and 2,966,506 and the teachings of both of these patents are incorporated herein by reference.

Speaking from a molecular structure point of view, some of the most highly preferred organoclays which can be used in the practice of this invention will comprise one or more of the following quaternary ammonium cation substituted clays:

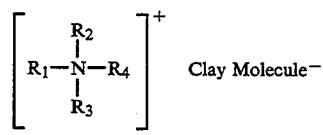

wherein $R_1$ is an alkyl group having at least 10 carbon atoms and up to 24 carbon atoms, and preferably having a chain length of from 12 to 18 carbon atoms; $R_2$ is hydrogen, benzyl or an alkyl group of at least 10 carbon atoms and up to 24 carbon atoms, and preferably from 12 to 18 carbon atoms; and $R_3$ and $R_4$ are each hydrogen or lower alkyl groups, vtz., they contain carbon chains of from 1 to 4 atoms, and preferably are methyl groups.

Some other preferred organoclays for our purposes can be represented by the formula:

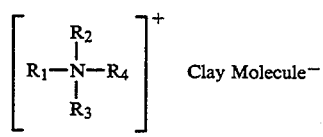

wherein $R_1$ is $CH_3$ or $C_6H_5CH_2$;

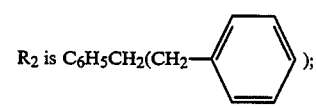

and $R_3$ and $R_4$ are alkyl groups containing long chain alkyl radicals having 14 to 22 carbon atoms, and most preferably wherein 20 to 35% of said long chain alkyl radicals contain 16 carbon atoms and 60% to 75% of said long chain alkyl radicals contain 18 carbon atoms. One particularly preferred organoclay species is alkyl dimethyl benzyl ammonium chloride.

It also should be understood that the organoclay flocculation agents of this patent disclosure may further comprise other active ingredients. That is to say that applicant's flocculation agents may contain ingredients (other than "inert" carrier fluids—if carrier fluids are in fact employed) which may, in certain circumstances aid ill the overall practice of this invention. For example, applicant's flocculation agent composition may further comprise one or more polar organic compounds. The use of these additional ingredients may be especially efficacious in sea water. That is to say that the addition of the polar organic compound may provide for substantial reduction in the amount of amine-substituted clay required to achieve the same substantial solidification of the oil. Again, this may be especially true in the case of oil spills in sea water. If employed, such polar organic compound(s), preferably, will constitute from about 0.01 to about 10 parts by weight of the polar organic compound(s) per 100 parts by weight of the amine-substituted clay. Suitable polar organic compounds for the practice of our invention would include alcohols, carbonates, acetates, ethers, ketones, benzoates and halogenated hydrocarbons and especially those having between about 1 and about 10 carbon atoms. Within these broad groups the most suitable polar organic compounds will include diethyl carbonate, propylene carbonate, methylacetate, ethylacetate, isoamylacetate, diisopropyl ether, diethyl ether, methylethyl ketone, diethyl ketone, diisopropyl ketone, ethyl benzoate, trichloroethane, carbon tetrachloride, and chlorobenzene. However, in general, the most preferred of these compounds will be the least expensive polar organic compounds. The most preferred of these can be taken from the group consisting of the lower molecular weight alcohols having between 1 and about 8 carbon atoms, particularly: methyl alcohol, ethyl alcohol, n-propyl alcohol, isopropyl alcohol, hexyl alcohol and tert-butyl alcohol.

In general, these polar organic compounds can be added to the amine-substituted clay in any of several ways known to this art, e.g., by incorporating the polar organic compound into the organoclay to produce an organoclay/polar organic compound mixture for later use as a flocculation agent or by physically mixing the organic compound with the clay as they are dispensed upon the spilled oil.

Applicant's amine-substituted clay flocculation agents may be added to the oil-polluted water in widely varying proportions depending upon the end result desired in a given embodiment of applicant's invention. The microorganisms can be added in conjunction with the flocculation agents (and any optional ingredients associated with them, e.g., polar compounds such as alcohols and the like) or they can be added in a distinct microorganism dispensing step or procedure, e.g., by a separate spraying operation. As a minimum requirement however, applicant's clays should be added to the oil - contaminated water in amounts sufficient to at least promote a "herding effect" upon an oil film. For the purposes of this patent application the expression "herding effect" can be taken to indicate the phenomenon wherein a continuous oil layer, slick or film (even before any solidification or "clumping" action takes place) is broken up into distinct, discrete "islands" of oil on the surface of the water and thereby leaving larger surface areas of clear water having no oil film and/or emulsion which would otherwise hinder passage of sunlight and oxygen through the water.

Next, it should be noted that relatively low "dosage" or loading rates of the herein described flocculation agents generally will produce this herding effect while relatively higher loading rates generally will promote formation of buoyant, (i.e., floating, as opposed to sinking) quasi-solid, amine-substituted clay/oil flocculate "clumps." Incidentally, for the purpose of this patent disclosure the terms "loading rates", "usage rates", "dosage rates,", "concentrations", etc. for applicant's organoclay ingredients should be regarded as synonymous and they usually will be expressed in pounds of clay per U.S. gallon of oil or in some cases, as indicated, as a percentage, by weight, of the clay to the oil. On the other hand, it is generally more practical, to state a microorganism formulation "dosage" in terms of its weight percentage with respect to the clay component of the overall formulation. However, concern for establishing the proper "dosage" of a microorganism or mixture of microorganisms is somewhat complicated by the fact that a microorganism will usually be employed in conjunction with a microorganism carrier medium (e.g., a nutrient medium) which will often constitute the major part of the weight of the overall microorganism carrier medium. For example, in some of the more preferred embodiments of this invention the microorganism formulations so employed will generally constitute from about 10% to about 80% by weight of a total organoclay flocculation agent/ microorganism formulation when the microorganisms are associated with a microorganism carrier medium. However, the microorganisms themselves will normally constitute a rather small percentage of the weight of a microorganism/microorganism carrier formulation. Moreover, concern for the weight or "relative proportions" of the microorganisms themselves is further complicated by two other factors. The first is that the "units" for measuring the concentration or relative proportions of such microorganisms in a microorganism/ microorganism carrier medium is normally given as microorganism units - as opposed to the "weight" of the microorganisms - per gram of microorganismcontaining material (e.g., units per gram of microorganism/microorganism carrier formulation). The second complicating factor revolves around the fact that the microorganisms employed in applicant's process can be associated with either a liquid carrier or with a dry carrier. Moreover, the concentration or number of units of the microorganism may vary according to whether the carrier is a liquid or a solid.

For example, applicant has found that the preferred concentrations for the practice of the processes described in this patent disclosure are from about $10^8$ to about $10^{13}$ microorganisms per milliliter of liquid carrier and from about $10^8$ to about $10^{10}$ microorganisms per gram of solid carrier. These large numbers will, however, normally represent relatively small percentages by weight of microorganism carrier, diluent and/or nutrient compositions. For the most part, the microorganisms employed herein normally will not be applied in a "pure" state, but rather will be applied as part of a microorganism formulation comprised of a relatively small amount of the microorganism by weight plus any number of carrier, diluent and/or microorganism nutrient and/or fertilizer ingredients well known to the art.

Again, in general such microorganism/microorganism carrier, nutrient, etc., formulations will be used in proportions such that the microorganism formulations will preferably constitute from about 10 to about 80 weight percent of the organoclay flocculation agent. Thus, a "total" formulation, comprised of an organoclay flocculation agent and a microorganism/ microorganism carrier formulation will preferably be comprised of from about 55 to about 90 weight percent of the organoclay ingredient and from about 10 to about 45 weight percent of the microorganism/ microorganism carrier formulation.

Generally speaking, use of microorganism loading rates anywhere from about 10 to 80 weight percent of the weight of the organoclay (indeed even much higher loading rates) will not cause the clumps to be broken down to a point of mechanical weakness before about 4 days (96 hours). For example, microorganism/ microorganism formulation loading rates between about 10 and about 20 weight percent of a "total composition" (organoclay formulation and microorganism formulation) will usually not produce a "mechanical weakening" of the clumps until from about 240 to about 500 hours after said compositions are applied to the oil spill. Microorganism loading rates of greater than about 50 weight percent of the total composition may produce some mechanical weakening (e.g., such that the clumps will "break up" upon being mechanically picked up) in about 4 days.

It also should be noted that, in general, "herding" effects will take place at clay loading rates far less than what is usually needed to form the semi-solid "clumps". Thus such differences in clay loading rates represents a means of controlling this process. For example, applicant has produced herding effects at loading rates as low as about one-tenth of a pound of amine-substituted clay per gallon of oil both alone and in the presence of microorganism formulations. Again, in some cases this "herding" action may be all that is required and/or desired, but in most cases the formation of applicant's semi-solid clumps or clots is the more desired end result. Applicant also has found that loading rates higher than about three-tenths of a pound of clay per gallon of oil tend to produce semi-solid clumps in addition to the "herding" effect. Here again, these "clumps" are formed by the use of the organoclays alone or by the use of clay microorganism formulations. No appreciable differences in the rate of formation of the lumps and/or the mechanical character of clumps have been observed in these two cases. The most preferred loading rates (as far as the clays are concerned) for producing such clumps generally will be from about five-tenths of a pound of clay per gallon of oil to about one and one-half pounds of clay per gallon of oil. Again, clay loading rates much greater than those needed to form the desired semi-solid clumps can be employed, but such higher load rates are not preferred because they may produce "sinkable" clumps. However, it also should be specifically noted that loading rates high enough in theory to sink the resulting clumps can be employed before any sinking of the resulting clumps actually takes place—a result which applicant's process is designed to avoid. In general, the presence of higher and higher microorganism concentrations in these clumps will serve to make them more and more boyant.

Indeed, in seeking an upper limit to the loading rate (with the expression "upper limit" being defined as the loading rate which causes the resulting oil/clay clumps to sink), applicant has found that loading rates up to about 3.5 pounds of organoclay per gallon oil produced clumps which still float even though they theoretically had densities greater than that of sea water. This seemingly paradoxical phenomenon is probably caused by surface forces and/or surface chemistry phenomena between these flocculation agents and water as well as by the entrapment of air in the clumps as they are formed.

Again, however, as a practical matter, use of loading rates greater than those needed to produce clumps (e.g., loading rates preferably ranging from about 0.5 to 1.5 pounds of clay per gallon of oil) having sufficient mechanical strength to be picked up without unacceptable amounts of breakage of said clumps represents an unnecessary economic expense and, furthermore, introduces the possibility of producing clumps which may sink. Applicant has found that, in general, clumps having sufficient mechanical strength to be—if need be—effectively collected by a wide variety of mechanical means without breaking said clumps into unacceptably small pieces (e.g., those having average diameters of less than one tenth of an inch) can be produced at loading rates less than about 2.0 pounds of clay per U.S. gallon of virtually any kind of oil product. Once again, these clay concentration considerations are largely independent of microorganism concentrations ranging from about 10% to about 80% by weight of flocculation agent/ microorganism formulation. In other words the conjunctive presence of the microorganisms will cause virtually no variation in the clump's overall mechanical strength until at least about 96 hours after application of said microorganisms. However, microorganism concentrations of greater than about 50% will cause a somewhat faster rate of mechanical weakening after the initial 4 day period has passed. That is to say that after about 96 hours, clumps containing microorganisms in higher concentrations will weaken faster than clumps containing lower microorganism concentrations. For example, in FIG. 1, the curve designated "LSU LAB TEST" was based upon the use of an overall composition which was above 50% microorganism, while the curve designated "LMSC TANK TEST" was generated by a composition comprised of about 40% microorganism formulation.

In theory, "floatability" of applicant's clumps implies that they have densities less than about 1.025 in the case of sea water spills and densities less than 1.00 in the case of spills in fresh water. Such clumps will have an oil component generally having a density from about 0.85 to 0.98 and a clay components generally having a density greater than 2.0 and less than 3.0 (for example, most of applicant's preferred organoclays will have densities between about 2.5 and about 2.8). Many microorganisms and microorganism carrier combinations have densities which are usually less than 1.0. Consequently, agglomeration of these materials may well produce clumps having theoretical densities greater than that of the oil component alone. In general, it is preferred that the density of the clumps resulting from this process have densities less than that of the water with which the oil is associated. That is to say that in general, the resulting clumps preferably, but not necessarily, will have specific gravities less than 1.0 (i.e., the specific gravity of "fresh" water) or, in the case of oil spills in sea water, such clumps preferably should have specific gravities less than 1.025 (i.e., the specific gravity of sea water). In other words, since the organoclays themselves generally will have specific gravities from about 1.5 to about 2.0 and a bulk density of 32 lbs. to 45 lbs. per cubic foot (specific gravity bulk 0.5 to 0.7), care should be taken not to add so much of the amine-treated clay to a given area that the resulting clumps will have specific gravities greater than that of the water in which the oil spill has occurred. Again, however, clumps having theoretically calculated densities which would cause them to sink will usually, in fact, float owing to air entrapment, surface chemistry, the presence of microorganism formulation materials in the clump, etc.

At this point, it also should be reiterated that applicant's process seeks to form organoclay/ oil clumps which have the opposite character with respect to "sinkability" from those agglomerates produced by the process of the 477 patent; i.e., the clumps produced by applicant's process are specifically designed to "float" while those produced by the process of the 477 are specifically designed to "sink" so that they will serve to plug up leaks in an artificial liner of an artificially constructed toxic waste pond. With respect to the 477 patent reference, it also should be noted in passing that petroleum is a nonpolar material and thus can be distinguished from the majority of contaminant materials mentioned in the 477 patent which are associated with polar solvents.

The organoclay herding and/or agglomeration agents used in applicant's process are preferably sprayed on the spilled oil in substantially dry, finely divided, particle forms. The microorganisms also can be sprayed in dry forms or they can be sprayed in a liquid carrier. However, in many cases both ingredients can be mixed with a liquid carrier such as water or other ingredients such as alcohols and the like and then sprayed as a mixture of the flocculation agent and the microorganism (s). However, in some cases it may prove advantageous to spray the microorganism after the flocculation agent is dispensed on to the oil spill. Ship mounted spray guns can be employed for these purposes or the aminesubstituted clays and/or the microorganisms can be dispensed from aircraft by various "cropdusting" spray techniques known to the art. For example, one particularly preferred method of dispersing the herein disclosed flocculation agent(s) and/or microorganism-containing compositions onto an oil slick is through the use of bags carried under a helicopter by means of a sling. When the helicopter arrives over the oil spill a dump spout on the bag can be opened by a line controlled from the helicopter. The down-draft from the rotors will disperse the materials over the spill. The proper dump altitude will be determined from experience, observation, and will no doubt be dependent upon those local wind conditions which exist during the dispensing operation.

The organoclay particles dispensed by such methods can vary in size, but generally speaking smaller particles are preferred. For example, at least a major portion or, in some cases, substantially all of the organoclay particles will preferably be sized at about 100 mesh or smaller. Multiple applications of these organoclay agents are also contemplated. Again, the microorganisms can also be dispensed in particulate forms or they may be associated with a liquid carrier. Other active or inactive ingredients can also be simultaneously dispensed in particle forms as homogenous mixtures or as separately applied materials.

Most preferably, the quasi-solid organoclay/oil clumps resulting from the use of appropriate loading rates will have average diameters greater than about one tenth of inch. In most cases, however, the resultant clumps will have even larger average diameters—e.g., greater than about one inch. Indeed, clumps having average diameters greater than three inches will often result from applicant's process. In general, larger clump sizes are produced by the use of relatively larger loading rates of the organoclay (e.g., those between about one and about two pounds of clay per gallon of oil). Again, care should be taken when using such relatively higher loading rates, not to add so much of the organoclay to a given spill that sinkable clumps are in fact formed. Regardless of their size, however, the quasi-solid state of such organoclay/oil clumps—in conjunction with the fact that they are rendered in the form of floating units having average diameters greater than one tenth of an inch—makes them highly susceptible to being mechanically collected without having to simultaneously collect and treat huge quantities of water as part of the overall cleanup process.

Mechanical collection of the floating, quasi-solid flocculate clumps from the surface of the water—if such mechanical collection is necessary—will be most efficient when the mechanical collection means employed allows most of the water collected and/or taken up with the quasi-solid clumps to be drained away from said clumps before they are actually taken on board a cleanup vessel, hauled ashore or otherwise collected. By way of example, the mechanical collection means could include, but not be limited to, paddle collectors, water "porous" conveyor belts, screens, "raking" devices, floating fences and/or nets —and especially seine nets having mesh sizes less than the average diameter of the clay/oil flocculate clumps being collected. It also should be noted in passing that local conditions and available mechanical equipment may dictate certain clump "size" preferences. For example, larger clumps may be easier to pick up with certain kinds of mechanical equipment (e.g., "paddle" pick up devices) while smaller clumps generally will be more effective in attracting and further agglomerating oil as such smaller clumps are being collected for pickup, e.g., through the use of seine nets. Again, in some instances multiple applications of applicant's treated clays may aid in the production of larger clump sizes tailored to being collectible by different mechanical operations. In general such mechanical pick-up operations should be completed before about 4 days from the time that the microorganism formulation is applied. Again, after about 4 days the digestive action of the microorganism begins to weaken the clumps.

It also should be noted that, for the purpose of this patent disclosure, the expression "quasi-solid" also can be taken to mean that the organoclay/oil clumps resulting from applicant's process, even in a wet state (such as that existing just after such clumps are taken from the water by mechanical means and allowed to "drain" before being taken on board ship), will have an angle of repose ("angle of repose" —as that term is employed in tests commonly used to measure a material's tendency to "flow") of at least 20 degrees. That is to say that the clumps produced by the herein disclosed process can be piled up at this angle without flowing "downhill". In most cases, however, a mass of the clumps formed by applicant's process will be characterized by having an angle of repose far greater than 20 degrees. Indeed, in many cases, the clumps resulting from the herein disclosed process may even have an angle of repose greater than 90 degrees, i.e., the clump units may well be so cohesive that they will even support an "overhang" of such organoclay/oil clump units if they were subjected to such "angle of repose" test measurements. As previously noted, applicant also has found that the individual clumps formed by this process have more than enough mechanical strength to readily resist breakage into smaller units as a result of the rough mechanical handling operations they would experience in being collected in the water, picked from the surface of the water, drained and placed in a cleanup container. Again, however, after from about 4 days—and more certainly afater about 10 days time—the action of the microorganism in digesting the oil content of the clumps may have preceded the point where said clumps cannot be readily picked up without a great deal of "breakage."

In effect, applicant's overall process may serve to quickly convert the inherently more difficult problem of gathering and separating a liquid from a liquid to the inherently less difficult problem of gathering and separating a floating, immiscible solid from its associated liquid. In those embodiments of the herein disclosed process employing higher loading rates, the oil from water separation problem is solved by applying those amounts of organoclay flocculation agents to an oil spill so as to produce organoclay/oil clumps having a proper state (quasi-solid), a proper density (e.g., the clumps will be "floatable" and preferably have densities between about 0.85 and about 0.98) and a proper physical size (greater than one tenth of an inch on the average) in order to render those clumps susceptible to being retrieved without having simultaneously to take up large volumes of water. Thus, applicant's process stands in sharp contrast to those prior art processes using untreated clays which do not "solidify" the agglomerated oil, but rather merely agglomerate it into larger drops of "liquid" oil. Again, however, after the microorganism(s) present in clumps has had time to extensively digest the oil content of the clumps, any remaining floating material may also, once again, be difficult to pick up from the sea.

Applicant's process has other virtues as well. For example, the clumps produced by this process will form quickly, e.g., in less than about an hour and, once formed, persist in their quasi-solid state for very long periods of time, e.g., days and even weeks, if they are not yet exposed to the microorganisms. That is to say they will persist in "solid" forms for periods of time long enough for cleanup vessels to get to the spill site and begin operations. Moreover, its use tends to prevent migration of the oil spill since floating quasi-solids are less mobile in water than oil droplets which are broken down into finer and finer—and hence more "mobile"—dispersions by the action of waves and/or currents. Moreover, even if these quasi-solid clumps do land on beaches, they will not soak, wet or drain into a sand substrate in the manner of a "liquid" oil which has been agglomerated to a more viscous, but not solidified, form through the use of "untreated" (i.e., not having the herein described amine compounds) clays. The clumps resulting from applicant's process also will not commence to flow in the presence of sunlight in the event they do land on a beach. Hence, applicant's clumps have the added advantage of being able to be cleaned from the beach by mechanical means, e.g., sifting or screening devices, capable of separating one solid from another. In any event, these qualities of the clumps may be employed as part of the cleanup operation before the clumps are sprayed with the microorganisms.

Expressed in patent process terminology, applicant's method for flocculating oil dispersed in an oil-contaminated portion of a natural body of water will generally comprise: (1) adding to said oil-contaminated portion of water a flocculant/microorganism mixture comprising a flocculant comprised of an amine-substituted clay formed by reacting a water swelling clay with an amine compound selected from the group consisting of a primary amine salt, a secondary amine salt, a tertiary amine salt or a quaternary ammonium salt and a microorganism selected from the group consisting of at least one microorganism species having the ability to digest oil (the microorganism can be added in separate and distinct steps, or it can be admixed with the clay); and (2) adding said flocculant/microorganism mixture to said oil-contaminated portion of water in amounts sufficient to promote formation of buoyant, quasi-solid organoclay oil flocculate clumps which float in the water and which have average diameters greater than about one tenth of an inch and digest an oil component of said clumps. Again the herein disclosed processes may be employed in situations where the agglomerated islands of oil clay material and/or quasi-solid clumps are not mechanically removed from the surface of the water, but rather are fully degraded "in situ" as it were. Such further treatment also might include further chemical treatment of the oil contained in the islands and/or clumps as well as the digestion of the oil by the microorganisms. The action of the microorganisms also may be enhanced by periodic addition of microorganism nutrients. For example, the addition (on one or more occasions) of nutrients such as cottonseed protein or soybean milling by-products together with added nitrogen and phosphorus nutrients will provide a balanced nutritional medium for the microorganisms.

While the present invention can be carried out with broad scope of oil-digesting microorganisms, there are a number of microorganisms which are especially suitable for degrading oil associated with the islands or clumps of oil and flocculation agents. These species can be specially selected by elective cultures and screening techniques upon a wide variety of hydrocarbons. Again, the hydrocarbon degrading microorganisms genera most useful for the practice of this invention include bacteria, yeasts, actinomyces and/or filamentous fungi. Moreover, in the practice of this invention, selected suitable mixtures of the microorganisms enumerated hereinabove, alone or admixed with various nutrients and/or inert substance, can be readily employed.

The microorganisms may act on the oil and break it up into smaller units in periods of a few hours or less. In such cases, the globule particle sizes will usually decrease from about 200 microns to approximately 20 to 40 microns. After the globules reach the size of 6 to 20 microns, oxidation products will generally be realized in that hydroxides, alcohols, aldehydes, and acids are formed by the microorganisms which then die. When the assimilable nutrients are exhausted, there will be no contamination of the body of water by the microorganisms themselves.

Some preferred modes of employing such microorganisms in conjunction with the herein described amine-substituted clay flocculation agents will now be described. To this end, it first should be noted that it is usually preferred to use a mixture of most, or all, of the herein described microorganisms in order to obtain a broad spectrum of degradability, although single species of microorganisms or selected mixtures of the described microorganisms can be used in special situations.

The use of mixtures of microorganisms provides a larger, more preferred resulting biomass which is useful in the food chain of higher forms of life. The degradation of petroleum proceeds more rapidly when the oil spill is seeded with as many as 8 to 15 different cultures. Such mixing techniques provide a better means of attack for the several different substances which may be present in the oil slick. As was previously noted, the microorganisms can be seeded or dispersed over an oil spill area by means of boats, aircraft or other vehicles by the same general methods by which applicant's flocculation agents are dispersed. The microorganisms can be added separately from the flocculation agent (preferably it is added after the flocculation agent is dispersed) or it can be added in admixture with the flocculation agent. Such mixtures most preferably will comprise about 10% to about 40% by weight of the microorganism formulation and from about 60 to about 90% flocculation agent.

The microorganisms can be used as a slurry or in dry pelletized form with added nutrients. Additive nutrients for the microorganisms, e.g., inorganic salts of nitrogen and phosphorus can be made components of such compositions. Such mixtures also could be a number of selected microbial species chosen for a particular clean-up operation, depending upon the type of oil, geographical location and time of year (temperature), etc. In general, the herein described processes can be carried out in temperatures ranging from above freezing temperature (e.g., about 7.2° C.) to about 39° C. The oil degradation will begin at once upon spreading the microorganisms on the oil spill surface. The evidence of oil degradation will become increasingly more evident after about 4 or 5 days. Complete degradation may take place as early as about three weeks, but may take longer depending upon the amount of oil spillage, temperature conditions, etc.

When the number of gallons of oil spilled is unknown, as from an off-shore well, the concentration of microorganisms added to the mixture of flocculation agent(s), absorbent and/or nutrient supplements, etc. (or separately added to the oil spill) should be at least about 2 lbs. of wet packed cells per acre of spill area. When the number of gallons of oil in an oil spill is known, the amount of mixture of microorganisms, flocculation agents and additive nutrients employed should be at least sufficient to provide a thin seeding of several percent by weight of the oil. About 5 to 15 percent of the spilled oil will often prove to be a desirable proportion. Amounts substantially less than this are slower acting although still effective, while substantially greater amounts are unnecessary except in special situations.

The process of the invention by which the oil is decomposed is a purely biological process in which selected bacteria, actinomycetes, yeasts and filamentous fungi break down the oil, crude petroleum, etc., by utilizing the hydrocarbons as the carbon source for their growth. Ultimately, applicant's process will result in the conversion of many tons of spilled oil into many tons of microbial cells which, in turn, become food for plankton, shellfish and other marine life. Moreover, since all of the microorganisms employed herein are terrestrial forms, they will eventually die off when the oil is all consumed. Hence, there is no need for subsequent clean-up operations after the microbial degradation has been completed. Generally speaking, applicant's amine-substitute clay flocculation agents will eventually sink when the oil with which they are associated has been eaten away.

DESCRIPTION OF PREFERRED EMBODIMENTS

Experimental Methods

Figure 1:
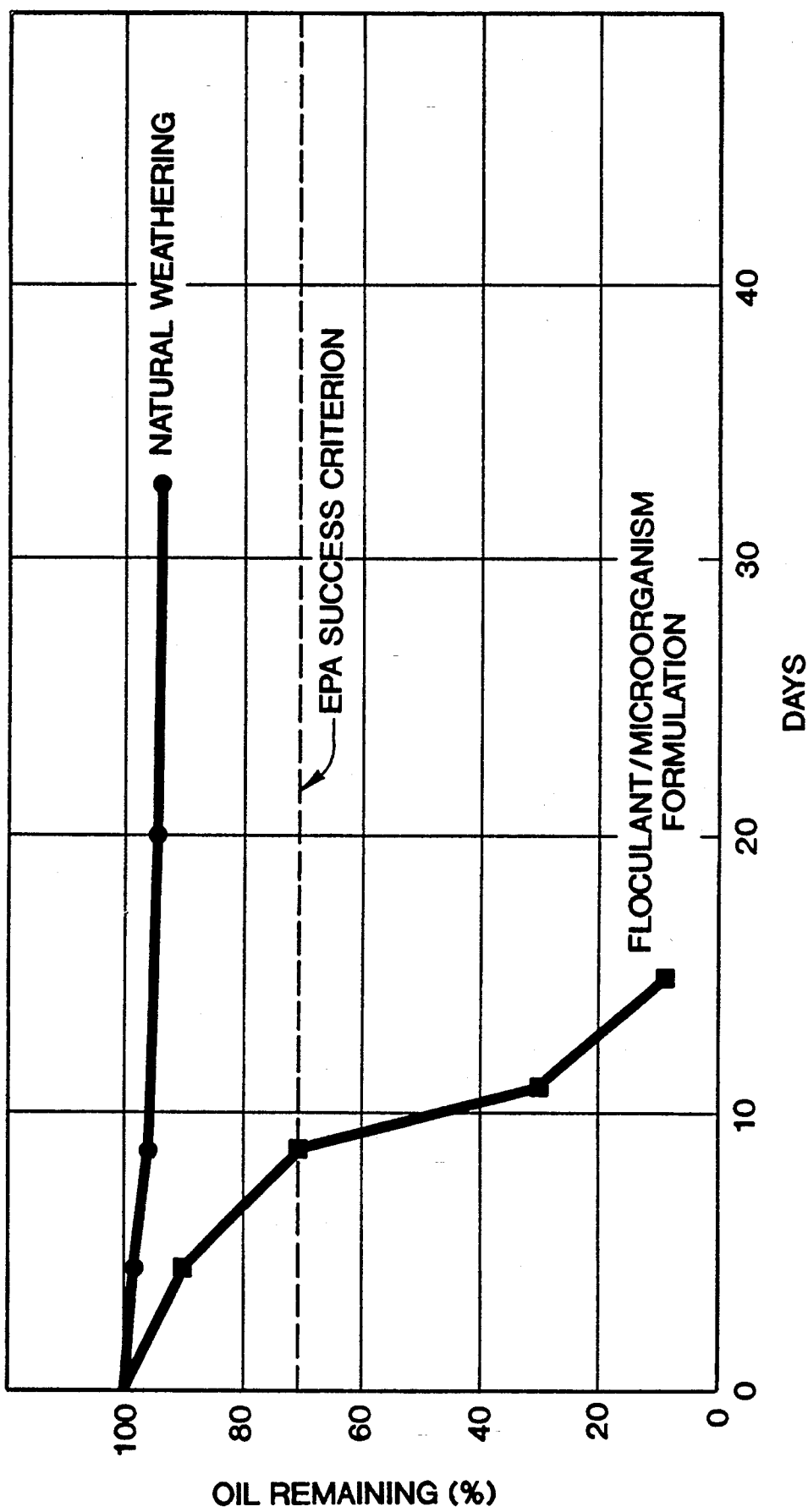
FIG. 1 depicts the ability of two different representative flocculation agent/microorganism formulations to degrade and hence "clean up" oil. These results are compared to natural degradation due to "weathering" and to degradation levels suggested by the Environmental Protection Agency (EPA) in order to meet one EPA criterion for success.

It should first be noted that in an initial series of experiments, which were made in anticipation of a "sinking" of clay/oil clumps in the manner taught in the 477 patent, applicant used formulations having known floatable materials such as UV-resistant polystyrene beads, chopped hemp fibers, gas-forming chemicals, etc. as a part of each flocculation agent composition then being tested. The "controls" against which these floatable material—containing formulations were tested, were simply the herein disclosed organoclays, but used without the additional flotation materials (beads, hemp fibers, etc.) noted above. Quite surprisingly, the "controls" produced agglomerated materials which continued to float at unexpectedly high loading rates (e.g., those implying theoretical densities significantly greater than 1.0). That is to say that applicant found that the additional floatable materials such as sawdust, beads, etc., simply were not needed to form either the oil/clay islands or the oil/clay "clumps".

In response to this discovery, and in order to test the effectiveness of various clays (both "amine treated" organoclays as well as analogous, "untreated" clays), an aquarium test tank was employed in a series of tests of the herein described processes. Use of this kind of tank permitted observation and photography of the top, underside, edges and bottom of the test tank. A given loading rate was chosen for a given set of experiments. Various loading rates were then tested using some amount of a clay/microorganism mixture, e.g., 2.0 pounds of clay and 0.2 lbs of microorganism/microorganism carrier formulation per U.S. gallon of oil for a given test series. Some of these experiments also tested the clays alone—that is to say the clays were not mixed with microorganisms. These tests generally indicated that the microorganisms do not interfere with the clay's ability to form the clumps. By way of further example, one such series of experiments involved placement of 300 ml of Ventura Crude oil on a simulated sea water composition in a tank which formed a sea water surface area having 9"×18" dimensions. These conditions produced a system having an initial oil spill thickness of about 2.87 mm. Thus, the clay loading rate, in effect, was two pounds per gallon of the Ventura crude oil. This represented a loading rate of approximately 25% by weight. Various visual observations of the system were made over time. By way of example, the observations made with respect to a treated montmorillonite clay/Ventura oil system is shown as Table 3. Analogous observations also were made for analogous systems employing "untreated" clays. For example the results of such observations for "untreated" sodium montmorillonite clay and/or untreated sepiolite clay are shown in Tables 1 and 2 respectively. Again, the results of these tests are to be contrasted with the results shown in Table 3 which indicates the results of using an amine-treated clay of the type employed in this process. This particular table (Table 3) depicts the results of using a particularly preferred amine-substituted clay - a montmorillonite clay treated with dimethyl di(hydrogenated tallow) ammonium chloride.

In comparing these results, it first should be noted that the result of using an untreated clay such as sodium montmorillonite or sepiolite was the formation of an unconsolidated slime which adhered to the sides and bottom of the tank. It also should be noted that, in both cases, these untreated clays sank at least a part of the oil. The sunken oil formed on the bottom of the tank and had no form other than that produced by surface tension. Applicant also noted that many of the liquid oil "clots" produced by the untreated clays which formed on the bottom of the tank eventually rose again to the surface, apparently as a result of an unknown gas-forming reaction. When such rising clots reached the surface, they released a bubble of gas and the oil of the clot simply rejoined the unconsolidated oil on the surface. It was not possible to discern any evidence of solidification of these materials in the regions where such rising "clots" had surfaced. Moreover, the entire surface remained uniformly slimy and unconsolidated. Such materials also covered the entire top of the sea water in the tank. That is to say there were no openings created in the "oil slick." The "clots" which remained on the bottom could not be retrieved, except by pipet, since they had no mechanical strength. In effect, materials were simply a liquid only slightly more viscous than the original crude oil itself. Agitation of the water in the tank demonstrated that no solidification had taken place.

Such observations were contrasted with results obtained after applying applicant's amine-substituted clays to the oil under otherwise comparable test conditions. Again, the results given in Table 3 are more or less typical of those found for various other analogous experiments, e.g., as those using loading rates different from 2.0 pounds of clay/gallon. Those loading rates falling in applicant's 0.5 to 1.5 pounds/gallon preferred range produced clumps generally having as much mechanical strength as those produced at higher loading rates, e.g., those produced at loading rates of 3.5 pounds/gallon. Next, it should be emphasized that there were no "sinking clots" created by the use of applicant's amine-treated clays over the entire loading range of 0.1 to 3.5 pounds of clay/gallon of oil. All clumps created in this manner remained afloat.

Mild agitation, simulating wave action, immediately opened up large areas of open water, as the solidified clumps formed up into balls and chunks of varying size, all of which remained afloat and were easily retrieved either singly or by netting without any significant breakage. The results of the repitition of such tests in many variations of these tests show that when amine-substituted clays are added to oil spilled on water in quantities of from about 0.3 to about 3.5 pounds of such clay per U.S. gallon of oil quasi-solid, floating oil/clay clumps are produced having sufficient mechanical strength to be picked up out of the water without appreciable breakage of said clumps. Such clumps have average diameters of at least one-tenth of an inch and in most cases will have significantly larger diameters on the order of 2-3 inches, or even larger.

A general description of the procedures and the results of some of applicant's tests are given in Tables 1, 2 and 3. Thereafter the microorganism use aspects of this invention will be further described.

TABLE I

Test Results Using Untreated Sodium Montmorillonite

| Observation # | | |
|---|---|---|
| 0A | Edge view of slick - no clay added | |
| 1A | 2 min after drop of Sodium Montmorillonite | |
| 2A | 3 min after drop of Sodium Montmorillonite | |
| 3A | 4 min after drop of Sodium Montmorillonite | |
| 4A | 5 min after drop of Sodium Montmorillonite | |
| 5A | 6 min after drop of Sodium Montmorillonite | shows sunken clots; also some clay on top; oil on top is unaffected, untreated. Clots on bottom extremely fluid; no "forming." |
| 6A | 8 min after drop of Sodium Montmorillonite | |
| 7A | 10 min after drop of Sodium Montmorillonite | |
| 9A | 12 min after drop of Sodium Montmorillonite | |

Note:
Some of the clots that initially dropped to bottom developed internal gas and came back up. These rose very rapidly, and broke through the untreated oil, "burped" off their gas, and simply disappeared (as clots, that is) in the plain oil on top.

TABLE 2

Test Results Using Untreated Sepiolite

| Observation # | | |
|---|---|---|
| 10A | Edge view of slick - no clay added | |
| 11A | 3 min after drop of Sepiolite | |
| 12A | 6 min after drop of Sepiolite | Same "rise" activity as with Sodium Montmorillonite. Clots on bottom slightly more firm. Oil on top remained fluid; no "forming." |
| 13A | 30 min after drop of Sepiolite | |
| 14A | 30+ min after drop of Sepiolite | |
| 16A | 30+ min after drop of Sepiolite | |
| 17A | 30+ min after drop of Sepiolite | |
| 18A | 30+ min after drop of Sepiolite | |
| 19A | 30+ min after drop of Sepiolite | |

TABLE 3

Test Results Using Treated Clay

| Observation # | | |
|---|---|---|
| 1 | Edge view before drop | |
| 2 | 5 min after drop - | |
| 3 | 10 min after drop - | nothing falling |
| 4 | 15 min after drop - | |
| 5 | 15+ min after drop - top view, surface not disturbed | |
| 6 | 15+ min after drop - top view, surface not disturbed | |
| 7 | 15+ min after drop - undersurface, not disturbed | |
| 8 | 15+ min after drop - mild agitation; clots shown - all floated back up | |
| 9 | 15+ min after drop - heavy agitation | |
| 10 | 15+ min after drop - | |
| 12 | 15+ min after drop - | shows solidification, flotation, clear water |
| 13 | 15+ min after drop - | |

TABLE 3-continued
Test Results Using Treated Clay

Observation #

14  15+ min after drop -           on top

MICROORGANISM ASPECTS OF INVENTION

Applicant conducted a series of experiments wherein the amine treated organoclays described previously were associated with certain microorganisms (and mixtures of microorganism species—at various microorganism "loading" or "dosage" concentrations) in order to establish how soon the mechanical strength properties of the oil/clay clumps formed by the use of the herein disclosed processes were impaired. These tests also were continued to determine the time periods needed to "digest" the oil. In general, this series of experiments established that within the microorganism dosages employed in this process, the oil/clay clumps did not begin to weaken until about 4 days after the microorganisms were applied. Complete digestion usually did not take place for at least 10 days. Digestion periods of 10 to 40 days were normally required and this 10–40 day variation depends upon the microorganism concentrations, use of microorganism nutrients, temperature and other degradation, influencing factors known to the art. The 4 day time period for the digestion to influence the clump's mechanical properties implies that if the microorganisms are applied along with the organoclays, then the resulting clumps should be mechanically picked up from the water's surface before about 4 days time. Therefore, addition of the microorganisms can be delayed for many days in order to facilitate a given cleanup operation. If, on the other hand the clumps are not ever going to be picked up, but rather are to be fully digested while floating on the surface of the water, then the 4 day period is of no great concern and the digestion process will—depending on microorganism loading rates, etc.—generally take place over a period of time of from about 10 days up to about 35 to 40 days. Digestion (oil reduction) rates for two representative formulations are depicted in FIG. 1.

Generally speaking, the growing of cultures of microorganisms employed in this invention are done in accordance with procedures well known to the art. For example, microorganisms employed in the present invention will often grow on media with 100 percent marine water or with part marine water and part distilled water. Various salt water mediums have been found to be quite satisfactory for maintaining stock cultures. Native seawater can be used in most cases without further treatment. However, aeration was provided to supply oxygen to the fermentor vessel or tank used in applicant's experimental program. In most cases, bacterial cells are harvested after about two days, actinomycete cells are harvested after about four days, yeast cultures are harvested after about five days depending on turbidity, and fungal cultures are harvested after about five days. A large batch vessel or fermentor normally will be seeded with a young culture equivalent to about 5 to 8 percent of the total capacity of the fermentor.

Hence, either a synthetic culture medium or a natural nutrient medium is suitable for the growth of most of the microorganism strains employed in the present invention as long as it contains the essential nutrients for the growth of the particular microorganism strain or strains used. Such microorganism nutrients or fertilizers are well known in the art and include substances such as a carbon source, a nitrogen source, inorganic compounds and the like which are utilized by the microorganisms employed in appropriate amounts. Obviously, the microorganisms used herein will be specially selected for their ability to grow and survive in an aqueous nutrient medium containing a hydrocarbon or a mixture of hydrocarbons as the main carbon source. Such hydrocarbons will include mixed hydrocarbons such as petroleum crudes, kerosene, light oils, heavy oils, paraffin oils, jet fuels, gasoline, etc. Such microorganisms may also have the ability to grow in the presence of certain other organic substances such as alcohols, aldehydes, ketones, etc., which may be utilized in formulating applicant's flocculation agents.

Applicant has found that nutrient systems employing bran are particularly preferred for the practice of the herein described processes. Small amounts of other carbon sources such as carbohydrates, for example, glucose, fructose, maltose, sucrose, starch, starch hydrolysate, molasses, etc., or any other suitable carbon source such as glycerol, mannitol, sorbitol, organic acids, etc. may be used in the culture medium along with the hydrocarbon. These substances may be used either singly or in mixtures of two or more.

As a nitrogen source, various kinds of inorganic or organic salts or compounds such as urea or ammonium salts such as ammonium chloride, ammonium sulfate, ammonium nitrate, ammonium phosphate, etc., or one or more than one amino acid or crude proteins mixed in combination, or natural substances containing nitrogen, such as bran, cornsteep liquor, yeast extract, meat extract, fish meal, peptone, bouillon, casein hydrolysates, fish solubles, rice bran extract, etc., may be employed. By way of further example, certain fertilizers (especially phosphate and/or nitrogen source fertilizers), and other trace chemical additives will often prove to be particularly useful in making such cultures and/or in sustaining the growth of the microorganisms once they are added to the oil spill. These substances may also be used either singly or in combination of two or more.

Inorganic compounds which also may be added to the microorganism culture medium include magnesium sulfate, sodium phosphate, potassium dihydrogen phosphate, potassium monohydrogen phosphate, iron sulfate or other iron salts such as ferric trichloride manganese chloride, calcium chloride, sodium chloride, ammonium nitrate, etc.

The microorganisms employed in the present invention are best cultured under aerobic conditions, such as aerobic shaking of the culture or with stirring and aeration of a submerged culture at a temperature of, for example, about 5° to 35° C. and at a pH of, for example, about 6 to 8. The microorganisms are harvested at appropriate times. In some of the more preferred embodiments of this invention, a carefully selected suitable mixture of microorganisms enumerated in subsequent sections of this patent disclosure can be admixed with an appropriate inert substance which serve as "carrier" materials for the microorganisms. For example, the inert substance can be selected from the group consisting of celite, cellulose powder, wood shavings, sawdust, caro-sil or Silicagel which is precipitated silicic acid having the general formula $H_2SiO_3$ diatomaceous earth, kaolin, various fibers, finely ground sand, ground glass powder, oyster shell powder or clam shell powder.

The most preferred solid carrier materials, when solid carrier materials are used, include clays such as kaolin, zeolites and other microporous silicaalumina materials, silica gels, vermiculites and perlites, and particularly these in hydrophilic forms. The operable materials, however, include microporous materials of the class into which microorganisms and nutrients or microorganisms alone can be absorbed and freeze-dried, and which will subsequently absorb oil so as to bring this oil into a close relationship with the microorganisms for digestion. Two particularly preferred materials are vermiculite and ideally an exfoliated vermiculite and rice bran.

After admixing, the mixture is then dried at a temperature ranging from 25° to 55° C. and preferably from 30° to 50° C. so as to form an anhydrous powder. The drying temperature must be maintained within this range in order to ensure that the full biological activity and viability of the final product is maintained. Alternatively, the mixture can be lyophilized (freeze-dried) in order to form the said anhydrous powder.

In this form, the microorganisms can be stored until they are required for use in dispersing and degrading various oil spills. However, at their time of use, such dry matter can be reconstituted with an aqueous phase such as seawater so as to maintain the viability and biological activity of the microorganisms. The reconstitution step requires vigorous mixing to avoid caking. The reconstituted liquid is then sprayed over an area containing an oil spill, preferably rapidly and evenly.

REPRESENTATIVE MICROORGANISM MIXTURES

The following example is given merely as illustrative of the present invention and is not to be considered as limiting. That is to say that various embodiments of the invention have been discussed throughout the application and the following is but one more specific example of such formulations. The general mixture of bioremediation agents used with applicant's flocculation agents to remediate oil spills on seawater will often be primarily pseudomonas species which are preferably used in conjunction with bacillus species, azobacter species and/or xanthomonas species. Fertilizer, bran, DNA and other host agents also can be added as needed to provide nutrients and carriers for these bacteria types.

PREFERRED MICROORGANISM MIXTURE

One particularly preferred microorganism mixture (whose relative proportions to each other are expressed as microorganism units per volume) for the practice of this invention will include:

| Microorganism | Relative Proportion |
| --- | --- |
| *Bacillus subtilis* | 15% |
| Mixed Bacillus species | 10% |
| *Pseudomonas aruginosa* (various strains) | 35% |
| Mixed Pseudomonas species | 5% |
| Equal Azobacter species and Xanthomonas species | 5% |
| Fertilizer (phosphate & nitrogen), bran & other trace chemical additives | 30% |

REPRESENTATIVE CLAY/MICROORGANISM FORMULATIONS

Applicant conducted many tests to determine the effects of the microorganism "dosages" on the rate of digestion of spilled oil which was converted into amine-substituted clay/oil "clumps" through the use of the herein described processes.

The results of two such tests are depicted as a part of FIG. 1. The results of one such test is the curve labeled "LSULAB TEST" in FIG. 1. The results of the other test is depicted by the curve labeled "LMSC TANK TEST." The two other lines in FIG. 1 depict oil degradation due to natural weathering effects and an EPA test standard.

The LSU LAB TEST used South Louisiana crude oil for the simulated spill. The formulation employed was comprised of:

| | |
| --- | --- |
| *0.23 lbs | an amine-substituted clay per gal. crude oil |
| **0.12 lbs | microorganism formulation (liquid) per gal. crude oil |
| ***0.03 lbs | microorganism nutrient formulation per gal. crude oil |

The LMSC TANK TEST used Kuwait crude oil in its test. The formulation employed in this test was comprised of:

| | |
| --- | --- |
| *0.5 lbs | an amine-substituted clay per gal. crude oil |
| **0.2 lbs | microorganism formulation (liquid) per gal. crude oil |
| ***1.3 lbs | microorganism nutrient formulation per gal. crude oil |

*The amine-substituted clay was sodium montmorillonite dihydrogenated tallow ammonium chloride.
**The microorganism formulation was the "Preferred Microorganism Mixture" described above.
***The fertilizer employed was a commercially available fertilizer whose chief active ingredients are ammonium nitrate and ammonium phosphate.

Note: The fertilizer was added to these particular test runs because of the limited amount of water available in the test tank because the normal fertilizer available in a small amount of water would have been depleted very quickly. In real ocean water spill situations, the fertilizer probably will not be a required additive. On the other hand, such nutrients and fertilizers can be added to ocean water spills to speed up or otherwise augment the oil digestion process.

The tests which produced the oil reduction graph depicted as the "LMSC" curve in FIG. 1 were performed using 9.38 gallons of oil on top of 1400 gallons of seawater contained in a tank approximately 4 feet wide × 14 feet long and 4 feet deep. Twelve pounds of an ammonium nitrate/ammonium phosphate fertilizer was stirred into the seawater before adding the crude oil. About 4.7 pounds of the aminesubstituted clay noted above was then sprinkled onto the oil as evenly as possible. Thereafter, 2 pounds of a microorganism formulation which was based upon a host rice bran carrier was evenly distributed on top of the oil/clay mixture which was floating on top of the seawater. This test was then compared to an identical tank of seawater with 9.38 gallons of crude oil on top and the same fertilizer mixture present in the water. This test is represented on the graph by the line identified as "Natural Weathering.", It thus can be seen that the present invention provides a desirable and advantageous way for degrading and cleaning up petroleum by means of microbial degradation, so as to restore the oil polluted area to a habitable and ecologically-clean environment. This procedure is carried out safely without any additional harm being done to animal or marine life as a result of the use of this process.

It is to be understood that the present invention embraces the use not only of the above-described microorganisms, which are given merely for illustrative purposes, but it also includes the use of mutants produced from the specifically enumerated microorganisms, providing that they perform the same function. It is to be further understood that the invention includes the use of cultures obtained by various standard microbiological techniques. Such mutants and/or subcultures may differ in certain respects from the above-described new strains, but will work to degrade petroleum in approximately the same manner as disclosed above.

Finally, it should be understood that various changes may be made in the details and arrangements of this process as well as in the procedures and functions carried out by them, without departing from the scope of the invention which consists of the matter shown and described herein and set forth in the hereinafter appended claims.

Thus having disclosed this invention, what is claimed is:

1. A process for flocculating and degrading oil associated with an oil-contaminated portion of a natural body of water, said process comprising:
   (1) adding to said oil-contaminated portion of water a flocculant/microorganism mixture comprising a flocculant comprised of an amine-substituted clay formed by reacting a water swelling clay with an amine compound selected from the group consisting of a primary amine salt, a secondary amine salt, a tertiary amine salt or a quaternary ammonium salt and at least one microorganism species having the ability to digest oil; and
   (2) adding said flocculant/microorganism mixture to said oil-contaminated portion of water in amounts sufficient to promote formation of buoyant, quasi-solid organoclay oil flocculate clumps which float in the water and which have average diameters greater than about one tenth of an inch and allowing the microorganisms to digest an oil component of said clumps.

2. The process of claim 1 wherein the amine compound further comprises an organo group having from 1 to 24 carbon atoms.

3. The process of claim 1 wherein the amine compound further comprises an organo group having from 10 to 24 carbon atoms and wherein said organo group is selected from the group of organo groups consisting of dodecyl, hexadecyl, octadecyl and dimethyloctadecyl.

4. The process of claim 1 wherein the water swelling clay is selected from the group consisting of montmorillonite, saponite, hectorite, beidellite, sepiolite nontronite, stevensite and sauconite.

5. The process of claim 1 wherein the water swelling clay is a montmorillonite clay selected from the group consisting of sodium montmorillonite, calcium montmorillonite and or magnesium montmorillonite.

6. The process of claim 1 wherein the amine compound with which the water swelling clay is reacted is an organic amine which is such that a compound having a structural formula:

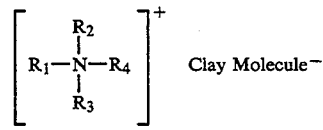

is produced, wherein $R_1$ is an alkyl group having at least 10 carbon atoms and up to 24 carbon atoms, and preferably having a chain length of from 12 to 18 carbon atoms; $R_2$ is hydrogen, benzyl or an alkyl group of at least 10 carbon atoms and up to 24 carbon atoms, and $R_3$ and $R_4$ are each hydrogen or lower alkyl groups.

7. The process of claim 1 wherein the amine compound with which the water swelling clay is reacted is an organic amine which is such that a compound having a structural formula:

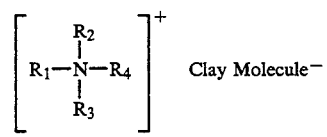

is produced wherein $R_1$ is $CH_3$ or $C_6H_5CH_2$;

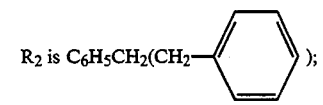

and $R_3$ and $R_4$ are alkyl groups containing long chain alkyl radicals having 14 to 22 carbon atoms.

8. The process of claim 1 wherein the water swelling clay is a montmorillonite clay and the amine compound is alkyl dimethyl benzyl ammonium chloride.

9. The process of claim 1 wherein the aminesubstituted clay flocculant is a mixture which further comprises a polar organic compound which comprises from about 0.01 to about 10 parts by weight of the polar organic compound per 100 parts by weight of the amine-substituted clay flocculant.

10. The process of claim 1 wherein the aminesubstituted clay flocculant further comprises a polar organic compound selected from the group of polar organic compounds consisting of isopropyl alcohol, hexyl alcohol, ethyl acetate and methyl ethyl ketone.

11. The process of claim 1 wherein the flocculant/microorganism mixture contains at least one microorganism species which constitutes from about 10% to about 40% by weight of the flocculant/microorganism mixture with which the flocculant/microorganism mixture is associated.

12. The process of claim 1 wherein the flocculant/microorganism mixture contains a mixture of microorganisms comprised of bacillus sp., pseudomonas sp., azobacter sp., and xanthomonas sp.

13. The process of claim 1 wherein the flocculant/microorganism mixture has a microorganism component of bacillus subtilis.

14. The process of claim 1 wherein the flocculant/microorganism mixture has a microorganism component of pseudomonas aruginosa.

15. The process of claim 1 wherein the micro-organism mixture is comprised of about 15% bacillus subtilis, 10% mixed bacillus species, 35% pseudomonas aruginosa, 5% mixed pseudomonas species, 5% equal azobacter species, xanthomonas species, and 30% fertilizer, bran and other trace chemical additives.

16. The process of claim 1 which further comprises mechanically herding said buoyant, quasi-solid flocculate clumps.

17. A process for flocculating and degrading oil associated with or on oil-contaminated portion of a natural body of sea water, said process comprising:
(1) adding to said oil-contaminated portion of seawater a flocculant/microorganism mixture comprising an organoclay flocculant comprised of an amine-substituted montmorillonite clay formed by reacting a montmorillonite clay with an amine compound selected from the group consisting of a primary amine salt, a secondary amine salt, a tertiary amine salt or a quaternary ammonium salt which each further comprises an organosubstituent having from 1 to 24 carbon atoms and at least one microorganism species having the ability to digest oil; and
(2) adding said flocculant/microorganism mixture to the sea water in amounts sufficient to promote formation of buoyant, quasi-solid, amine substituted montmorillonite clay/oil flocculate clumps which float in the sea water and which have average diameters greater than about one tenth of an inch and thereupon allowing the microorganism to digest an oil component of said clumps.

18. The process of claim 17 wherein the organoclay flocculant further comprises an organo group having from 10 to 24 carbon atoms selected from the group of organo groups consisting of dodecyl, hexadecyl, octadecyl and dimethyloctadecyl.

19. The process of claim 17 wherein the amine compound is alkyl dimethyl benzyl ammonium chloride.

20. The process of claim 17 which further comprises mechanically herding and floating, quasi-solid flocculate clumps.

21. The process of claim 17 wherein the montmorillonite clay is a montmorillonite clay selected from the group consisting of sodium montmorillonite, calcium montmorillonite and magnesium montmorillonite.

22. The process of claim 17 wherein the amine compound with which the montmorillonite clay is reacted is an organic amine compound having at least 10 carbon atoms, but no more than 24 carbon atoms, in the organic portion of the amine compound's chemical structure.

23. The process of claim 17 wherein the flocculant is added to the contaminated portion of the sea water in amounts which produce organoclays/oil clumps having specific gravities less than about 0.98.

24. The process of claim 17 wherein the flocculant is a mixture which further comprises a polar organic compound which comprises from about 0.01 to about 10 parts by weight of the polar organic compound per 100 parts by weight of amine substituted montmorillonite clay.

25. The process of claim 17 wherein the flocculant is a mixture which further comprises a polar organic compound selected from the group consisting of isopropyl alcohol, hexyl alcohol, ethyl acetate and methyl ethyl ketone.

26. The process of claim 17 wherein the flocculant/microorganism mixture contains one or more microorganism formulations which constitute from about 10 to about 80 percent by weight of the organoclay flocculant.

27. The process of claim 17 wherein the flocculant/microorganism mixture contains a microorganism mixture comprised of bacillus sp., pseudomonas sp., azobacter sp., and xanthomonas sp.

28. The process of claim 17 wherein the flocculant/microorganism mixture has a microorganism component of pseudomonas aruginosa.

29. A process for flocculating, herding and degrading oil associated with an oil-contaminated portion of a natural body of water, said process comprising:
(1) adding to said oil-contaminated portion of water a herding/degradation agent comprised of an amine-substituted clay formed by reacting a water swelling clay with an amine compound selected from the group consisting of a primary amine salt, a secondary amine salt, a tertiary amine salt or a quaternary ammonium salt and a microorganism selected from the group consisting of those bacillus, pseudomas, azobacter and xanthomonas species having the ability to digest oil; and
(2) adding said herding/degradation agent to said oil-contaminated portion of water in amounts sufficient to promote herding of the oil into islands of oil separated by surfaces of water containing substantially no oil.

30. The process of claim 29 wherein the water swelling clay is selected from the group consisting of montmorillonite, saponite, hectorite, beidellite, sepiolite nontronite, stevensite and sauconite.

31. The process of claim 29 wherein the water swelling clay is a montmorillonite clay selected from the group consisting of sodium montmorillonite, calcium montmorillonite and magnesium montmorillonite.

32. The process of claim 29 wherein the amine compound with which the water swelling clay is reacted is an organic amine which is such that a compound having the structural formula:

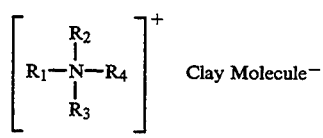

is produced, wherein $R_1$ is an alkyl group having at least 10 carbon atoms and up to 24 carbon atoms, and preferably having a chain length of from 12 to 18 carbon atoms; $R_2$ is hydrogen, benzyl or an alkyl group of at least 10 carbon atoms and up to 24 carbon atoms, and $R_3$ and $R_4$ are each hydrogen or lower alkyl groups.

33. The process of claim 29 wherein the amine compound with which the water swelling clay is reacted is an organic amine which is such that a compound having a structural formula:

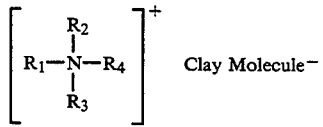

is produced wherein $R_1$ is $CH_3$ or $C_6H_5CH_2$;

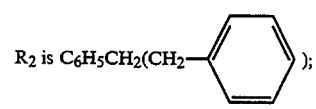

and R₃ and R₄ are alkyl groups containing long chain alkyl radicals having 14 to 22 carbon atoms.

34. The process of claim 29 wherein the water swelling clay is a montmorillonite clay and the amine compound is alkyl dimethyl benzyl ammonium chloride.

35. The process of claim 29 wherein the flocculant is a mixture which further comprises a polar organic compound which comprises from about 0.01 to about 10 parts by weight of the polar organic compound per 100 parts by weight of an organoclay flocculant.

36. The process of claim 29 wherein the organoclay flocculant is a mixture which further comprises a polar organic compound selected from the group of polar organic compounds consisting of isopropyl alcohol, hexyl alcohol, ethyl acetate and methyl ethyl ketone.

37. The process of claim 29 wherein the flocculant/microorganism composition contains one or more microorganisms which constitute from about 10 to about 80 percent by weight of the organoclay flocculant.

38. The process of claim 29 wherein the microorganism is a microorganism mixture comprised of Bacillus sp., Pseudomonas sp., Azobacter sp., and Xanthomonas sp.

39. The process of claim 29 wherein the microorganism is bacillus subtilis.

40. The process of claim 29 wherein the microorganism is pseudomonas aruginosa.

41. A process for flocculating and degrading oil associated with an oil-contaminated portion of a natural body of water, said process comprising:
(1) adding to said oil-contaminated portion of water a flocculant comprised of an aminesubstituted clay formed by reacting a water swelling clay with an amine compound selected from the group consisting of a primary amine salt, a secondary amine salt, a tertiary amine salt or a quaternary ammonium salt;
(2) adding said flocculant/microorganism mixture to said oil-contaminated portion of water in amounts sufficient to promote formation of buoyant, quasi-solid organoclay oil flocculate clumps which float in the water and which have average diameters greater than about one tenth of an inch; and
(3) thereafter, adding at least one microorganism species having the ability to digest oil to the oil-contaminated portion of water.

42. The process of claim 41 wherein the amine compound further comprises an organo group having from 1 to 24 carbon atoms.

43. The process of claim 41 wherein the amine compound further comprises an organo group having from 10 to 24 carbon atoms and wherein said organo group is selected from the group of organo groups consisting of dodecyl, hexadecyl, octadecyl and dimethyloctadecyl.

44. The process of claim 41 wherein the water swelling clay is selected from the group consisting of montmorillonite, saponite, hectorite, beidellite, sepiolite nontronite, stevensite and sauconite.

45. The process of claim 41 wherein the water swelling clay is a montmorillonite clay selected from the group consisting of sodium montmorillonite, calcium montmorillonite and magnesium montmorillonite.

46. The process of claim 41 wherein the amine compound with which the water swelling clay is reacted is an organic amine which is such that a compound having a structural formula:

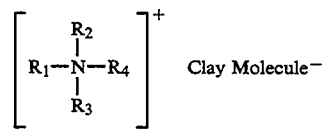

is produced, wherein R₁ is an alkyl group having at least 10 carbon atoms and up to 24 carbon atoms, and preferably having a chain length of from 12 to 18 carbon atoms; R₂ is hydrogen, benzyl or an alkyl group of at least 10 carbon atoms and up to 24 carbon atoms, and R₃ and R₄ are each hydrogen or lower alkyl groups.

47. The process of claim 41 wherein the amine compound with which the water swelling clay is reacted is an organic amine which is such that a compound having a structural formula:

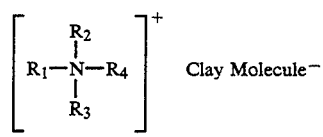

is produced wherein R₁ is CH₃ or C₆H₅CH₂;

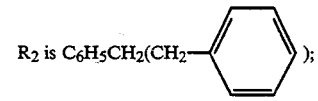

and R₃ and R₄ are alkyl groups containing long chain alkyl radicals having 14 to 22 carbon atoms.

48. The process of claim 41 wherein the water swelling clay is a montmorillonite clay and the amine compound is alkyl dimethyl benzyl ammonium chloride.

49. The process of claim 41 wherein the amine-substituted clay flocculant is a mixture which further comprises a polar organic compound which comprises from about 0.01 to about 10 parts by weight of the polar organic compound per 100 parts by weight of the amine-substituted clay flocculant.

50. The process of claim 41 wherein the aminesubstituted clay flocculant further comprises a polar organic compound selected from the group of polar organic compounds consisting of isopropyl alcohol, hexyl alcohol, ethyl acetate and methyl ethyl ketone.

51. The process of claim 41 wherein the microorganism constitutes from about 10% to about 80% by weight of the flocculant.

52. The process of claim 41 wherein the microorganism is a mixture of microorganisms comprised of bacillus sp., pseudomonas sp., azobacter sp., and xanthomonas sp.

53. The process of claim 41 wherein the microorganism is bacillus subtilis.

54. The process of claim 41 wherein the microorganism is pseudomonas aruginosa.

55. The process of claim 41 wherein the microorganism is a microorganism mixture comprised of about 15% bacillus subtilis, 10% mixed bacillus species, 35% pseudomonas aruginosa 5% mixed pseudomonas species, 5% equal azobacter species, xanthomonas species, and 30% fertilizer, bran and other trace chemical additives.

56. The process of claim 41 which further comprises mechanically herding said buoyant, quasi-solid flocculate clumps.

57. A process for flocculating and degrading oil associated with or on oil-contaminated portion of a natural body of sea water, said process comprising:
(1) adding to said oil-contaminated portion of seawater a flocculant comprised of an amine-substituted montmorillonite clay formed by reacting a montmorillonite clay with an amine salt, a secondary amine salt, a tertiary amine salt or a quaternary ammonium salt which each further comprises an organosubstituent having from 1 to 24 atoms;
(2) adding said flocculent to the sea water in amounts sufficient to promote formation of buoyant, quasi-solid, amine substituted montmorillonite clay/oil flocculate clumps which float in the sea water and which have average diameters greater than about one tenth of an inch; and
(3) thereafter, adding at least one microorganism species having the ability to digest oil to the oil-contaminated portion of water.

58. The process of claim 57 wherein the organoclay flocculant further comprises an organo group having from 10 to 24 carbon atoms selected from the group of organo groups consisting of dodecyl, hexadecyl, octadecyl and dimethyloctadecyl.

59. The process of claim 57 wherein the amine compound is alkyl dimethyl benzyl ammonium chlordie.

60. The process of claim 57 which further comprises mechanically herding said floating, quasi-solid flocculate clumps.

61. The process of claim 57 wherein the montmorillonite clay is a montmorillonite clay selected from the group consisting of sodium montmorillonite, calcium montmorillonite or magnesium montmorillonite.

62. The process of claim 57 wherein the amine compound with which the montmorillonite clay is reacted is an organic amine compound having at least 10 carbon atoms, but no more than 24 carbon atoms, in the organic portion of the amine compound's chemical structure.

63. The process of claim 57 wherein the flocculant is added to the contaminated portion of the sea water in amounts which produce organoclays/oil clumps having specific gravities less than about 0.98.

64. The process of claim 57 wherein the flocculant is a mixture which further comprises a polar organic compound which comprises from about 0.01 to about 10 parts by weight of the polar organic compound per 100 parts by weight of amine substituted montmorillonite clay.

65. The process of claim 57 wherein the flocculant is a mixture which further comprises a polar organic compound selected from the group consisting of isopropyl alcohol, hexyl alcohol, ethyl acetate and methyl ethyl ketone.

66. The process of claim 57 wherein the microorganism constitutes from about 10 to about 80 percent by weight of the flocculant.

67. The process of claim 57 wherein the microorganism is a mixture comprised of bacillus sp., pseudomonas sp., azobacter sp., and xanthomonas sp.

68. The process of claim 57 wherein the microorganism is pseudomonas aruginosa.

* * * * *